United States Patent [19]
Ono

[11] Patent Number: 4,620,241
[45] Date of Patent: Oct. 28, 1986

[54] TAPE SPEED CONTROL SYSTEM FOR MAGNETIC TAPE RECORDER

[75] Inventor: Tsuyoshi Ono, Yamato, Japan

[73] Assignee: Victor Company of Japan, Limited, Yokohama, Japan

[21] Appl. No.: 511,112

[22] Filed: Jul. 5, 1983

[30] Foreign Application Priority Data

Jul. 7, 1982 [JP] Japan ................................. 57-118287

[51] Int. Cl.$^4$ ............................................ G11B 15/46
[52] U.S. Cl. ........................................ 360/73; 318/7; 242/203
[58] Field of Search .................. 360/73; 318/326, 327, 318/70, 6, 7; 242/201–203, 75.51, 186

[56] References Cited

U.S. PATENT DOCUMENTS 3,704,401 11/1972 Miller ...................................... 318/7
3,912,990 10/1975 Kühnlein et al. ...................... 318/7
4,051,415 9/1977 Martin .................................... 318/7
4,121,138 10/1978 Flint et al. ............................. 318/7
4,394,994 7/1983 Oono ..................................... 360/73
4,479,159 10/1984 Kamei et al. .......................... 360/73

FOREIGN PATENT DOCUMENTS 1552047 9/1979 United Kingdom .
1556547 11/1979 United Kingdom .
2036304 6/1980 United Kingdom .

OTHER PUBLICATIONS

Microcomputer Dictionary and Guide, Sippl et al., 1976.

Primary Examiner—Raymond F. Cardillo
Assistant Examiner—Steven R. Garland
Attorney, Agent, or Firm—Jordan and Hamburg

[57] ABSTRACT

A tape speed control system for a magnetic tape recorder allows a magnetic tape to be fed at any desired speed in a fast feed mode operation. In a fast feed mode operation, rotation periods of take-up and supply reels are detected and one of them is weighted relative to the other. The sum of the weighted and non-weighted periods is compared with a predetermined reference period and the resulting difference signal is used to control drive motors associated with the respective reels, thereby causing the tape to run at a desired speed regardless of the roll radius thereof built up on the take-up reel.

4 Claims, 10 Drawing Figures

| TAPE RADIUS (mm) PERIOD | 11 | 12 | 13 | 14 | 15 | 16 | 17 | 18 | 19 | 19.6 |
|---|---|---|---|---|---|---|---|---|---|---|
| T_T | 16.1 | 17.6 | 19.1 | 20.5 | 22.0 | 23.5 | 24.9 | 26.4 | 27.9 | 28.8 |
| T_S | 37.4 | 36.7 | 36.0 | 35.2 | 34.3 | 33.3 | 32.2 | 31.0 | 29.7 | 28.8 |
| Tn=1 | 53.5 | 54.3 | 55.1 | 55.7 | 56.3 | 56.8 | 57.1 | 57.4 | 57.6 | 57.6 |
| Tn=1.5 | 72.2 | 72.7 | 73.0 | 73.3 | 73.4 | 73.4 | 73.2 | 72.9 | 72.4 | 72.0 |
| Tn=1.7 | 79.68 | 79.99 | 80.3 | 80.34 | 80.31 | 80.11 | 79.64 | 79.1 | 78.39 | 77.76 |
| Tn=2 | 90.9 | 91.0 | 91.0 | 90.8 | 90.5 | 90.0 | 89.3 | 88.4 | 87.2 | 86.4 |
| Tn=3 | 128.3 | 127.7 | 127.0 | 126.0 | 124.8 | 123.3 | 121.5 | 119.4 | 116.9 | 115.2 |

TAPE SPEED CONTROL SYSTEM FOR MAGNETIC TAPE RECORDER

BACKGROUND OF THE INVENTION

The present invention relates to a magnetic tape recorder and, more particularly, to a system for controlling the running speed of a magnetic tape in a fast feed mode operation of the tape recorder.

In a prior art magnetic tape recorder, a fast feed mode operation is effected by applying a predetermined voltage to a motor adapted to drive a take-up reel while pressing a piece of felt or the like against a supply reel to develop a back tension. This is to cause the tape to move at a speed simply dependent on the friction of a tape drive system of the tape recorder and the running speed of the tape per se is not controlled.

For tapes having relatively small frictional loads, the prior art tape recorder is designed to maintain the rotation torque of the take-up reel relatively small in order that the take-up speed may be prevented from being increased or that the tape may be prevented from spilling from the supply reel at the end of a take-up operation. This, however, would consume a disproportionate period of time for taking up the tape and make the tape recorder awkward.

Meanwhile, the running speed of a tape generally depends on a frictional coefficient particular to a tape as well as on a varying tape roll radius built up on a take-up reel (referred to simply as "tape radius" hereinafter for convenience). In this situation, various malfunctions tend to result due to the absence of particular controls over the tape speed. For example, on the tape recorder with an automatic program locating system, even a "tacet" in a single musical piece might be erroneously detected as an interval between different musical pieces.

SUMMARY OF THE INVENTION

It is an object of the present invention to effectively control a running speed of a magnetic tape in a magnetic tape recorder, particularly in a fast feed mode operation.

It is another object of the present invention to provide a tape speed control system for a magnetic tape recorder which is capable of causing a magnetic tape to run at a selected speed during a fast feed mode operation.

It is another object of the present invention to provide a generally improved tape speed control system for a magnetic tape recorder.

A system for controlling a running speed of a magnetic tape in a fast feed mode operation of a magnetic tape recorder, which includes a take-up reel and a supply reel each being driven by drive means in a rotation, of the present invention includes rotation period detector means for detecting a rotation period of the take-up reel and a rotation period of the supply reel. One of the detected rotation periods is weighted and a sum of the weighted and non-weighted periods is computed, each by computing means. Means is provided for predetermining a reference rotation period. Comparing means compares a sum period produced by the computing means with the reference period and generates a difference signal indicative of a difference therebetween. The difference signal is fed to the drive means, so that the magnetic tape is moved at a selected speed regardless of a tape roll radius built up on the take-up reel.

The above and other objects, features and advantages of the present invention will become apparent from the following detailed description taken with the accompanying drawings.

DESCRIPTION OF THE PREFERRED EMBODIMENTS

While the tape speed control system for a magnetic tape recorder of the present invention is susceptible of numerous physical embodiments, depending upon the environment and requirements of use, substantial numbers of the herein shown and described embodiments have been made, tested and used, and all have performed in an eminently satisfactory manner.

Figure 1:
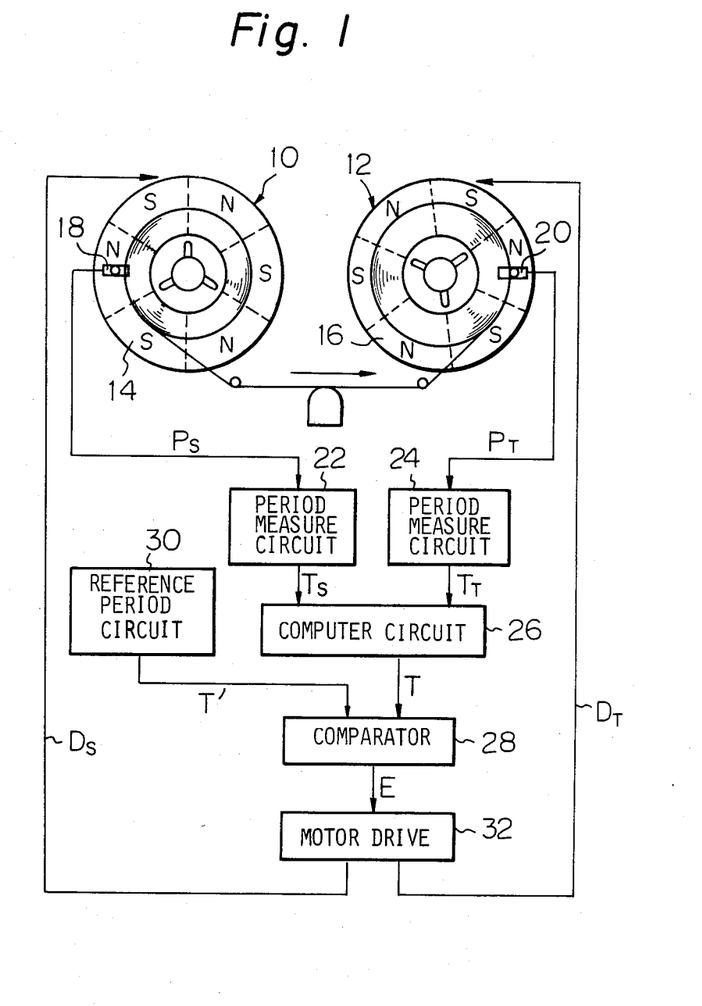
FIG. 1 is a block diagram of a tape speed control system for a magnetic tape recorder embodying the present invention.

Referring to FIG. 1 of the drawings, a supply reel 10 and a take-up reel 12 are mounted on a magnetic tape recorder and driven by, for example, a direct drive employing DC motors. Magnet discs 14 and 16 are coaxially mounted on the reels 10 and 12, respectively. A Hall element 18 is associated with the magnet disc 14 and a Hall element 20 with the magnet disc 16, each detecting the alternating magnetic polarities of the associated disc to output three pulses $P_S$ or $P_T$ for one rotation of the reel.

Now, suppose that a type "C-120" tape cassette has a maximum take-up radius $r_o$ of 25.5 mm and a minimum take-up radius (reel hub radius) $r_i$ of 11 mm. Then, an instantaneous tape radius $r_T$ on the take-up reel 12 and that $r_S$ on the supply reel 10 in a usual feed mode operation are related as follows:

$$r_S = \sqrt{r_o^2 + r_i^2 - r_T^2} \qquad \text{Eq. (1)}$$

Supposing that the number of pulses appearing for one rotation is N and tape speed is V, the pulse period $T_T$ related with the take-up reel 12 and that $T_S$ related with the supply reel 10 are individually produced by:

$$T_T = 2\pi r_T/NV \qquad \text{Eq. (2)}$$

$$T_S = 2\pi r_S/NV \qquad \text{Eq. (3)}$$

Combining and rewriting the Eqs. (1)–(3), we obtain:

$$V = \frac{2\pi}{NT_S} \sqrt{r_i^2 + r_o^2 - r_T^2}$$ Eq. (4)

$$= \frac{2\pi}{NT_S} \sqrt{r_i^2 + r_o^2 - \left(\frac{NVT_T}{2\pi}\right)^2}$$

$$\therefore V = \frac{2\pi}{N} \sqrt{\frac{r_i^2 + r_o^2}{T_S^2 + T_T^2}}$$

It will be seen from the above that an instantaneous tape speed can be determined by measuring the periods $T_T$ and $T_S$. When it comes to real-time processing with a microcomputer or the like, however, the operation represented by the Eq. (4) is too intricate to be suitable for digital processing or even for analog processing. In accordance with this embodiment, an equation simpler than the Eq. (4) and thereby a simpler operation is employed for controlling the tape speed in a fast feed mode to predetermined one.

A consideration will be given to the relationship between a tape radius on the take-up reel 12 and pulse periods of the coactive reels 10 and 12.

Suppose that the tape recorder is operating in the fast feed mode to feed the tape at a thirty times higher speed than the usual feed mode by means of some speed control means. Then, the pulse period $T_T$ of the take-up reel 12 and that $T_S$ of the supply reel 10 will vary as indicated in a set of rows a in FIG. 2 up to the instant the tape radius $r_T$ on the take-up reel 12 coincides with that on the supply reel 10. In this embodiment, pulse periods $T_S$ and $T_T$ associated with the reels 10 and 12 are individually detected and a sum T of the periods $T_T$ and $T_S$, which is almost ideal, is obtained using a simple equation:

$$nT_{GE} + T_{Le} = T$$ Eq. (5)

where $T_{GE}$ is larger one of the detected periods $T_T$ and $T_S$, $T_{LE}$ is the other or smaller period, and n is a constant (1, 1.5, 2, 3, etc.) suitably selected in conformity to a desired accuracy.

An instantaneous period T is compared with a reference or target period T' which is predetermined using the Eq. (5), so that the rotation speeds of the reels 10 and 12 may be controlled to establish the reference period T', whatever the tape radius on the reel 12 may be. It should be noted in the Eq. (5) that:
when $T_T > T_S$, $T_T$ is $T_{GE}$ and $T_S$ is $T_{LE}$,
when $T_T = T_S$, $T_T = T_S = T_{GE} = T_{LE}$, and
when $T_T < T_S$, $T_S$ is $T_{GE}$ and $T_T$ is $T_{LE}$.

Figure 2:
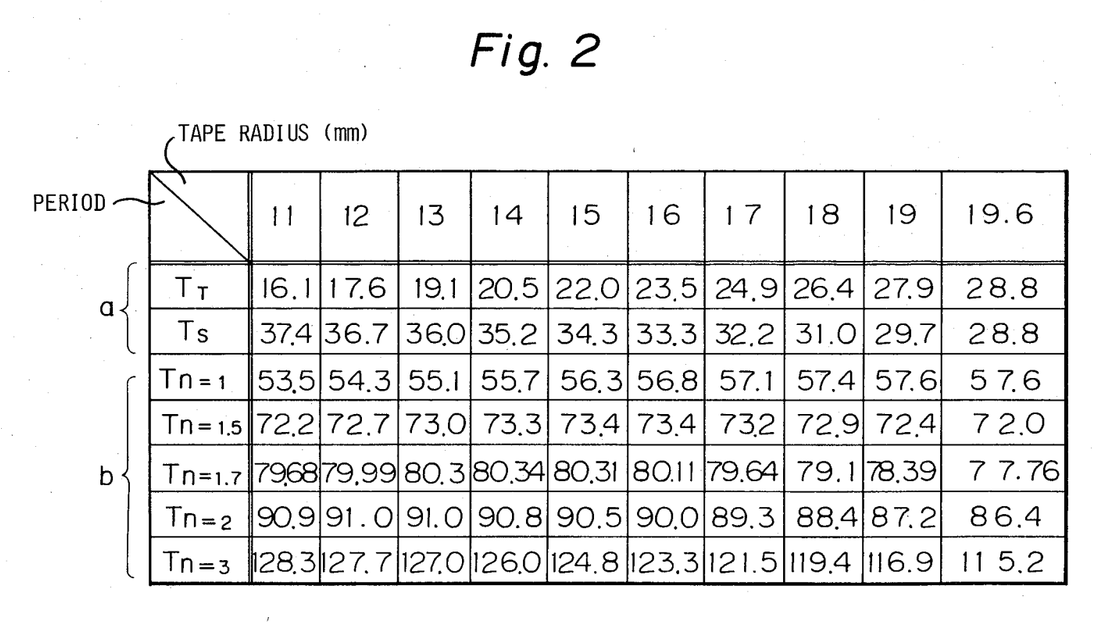
FIG. 2 consisting of a and b, is a table showing rotation periods of take-up and supply reels and those computed by weighting the rotation periods, each in a fast feed mode operation which is thirty times faster than an ordinary feed mode operation.
Figure 3:
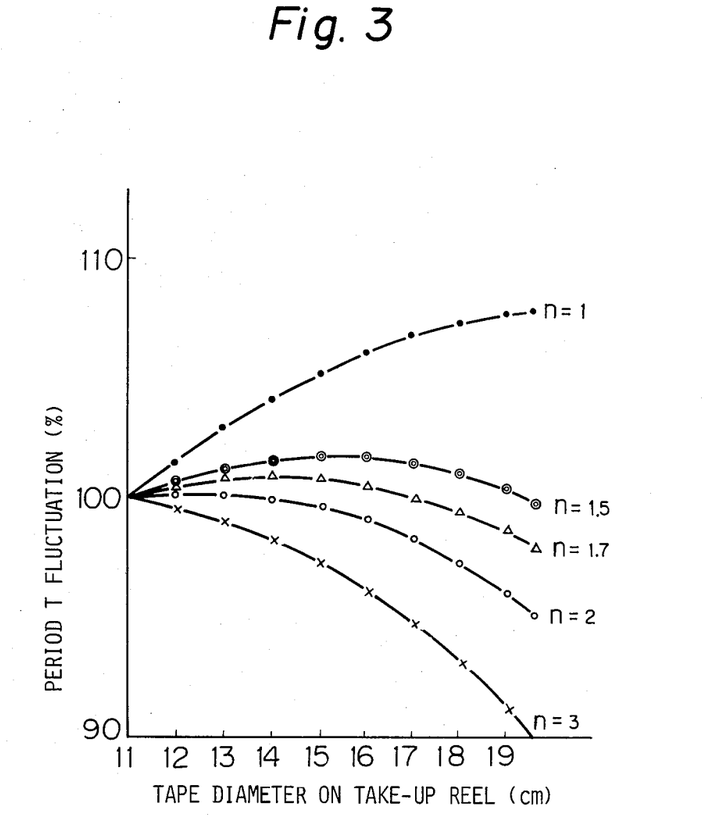
FIG. 3 is a graph demonstrating a tape radius to period fluctuation characteristic attainable with the system of the present invention.

Rows generally indicated b in FIG. 2 show periods T which were obtained for various constants n by processing the pulse periods of a in FIG. 2 with the Eq. (5). It will be seen that, when the constant n is 1.5, the period T undergoes the least fluctuation with respect to the tape radius on the take-up reel 12 thereby permitting the tape speed to be controlled substantially to a constant value. Curves shown in FIG. 3 represent fluctuations of the sum period T for various tape radii on the take-up reel 12 which were obtained from the values in b of FIG. 2, the fluctuation being supposed to be 100% at the start of a take-up operation. As shown, so long as the constant n lies within the range of 1–3, the fluctuation of period T substantially remains less than 10%. Particularly, when n=1.5, an accuracy as high as ±1% is achieved with respect to a medium value of the fluctuation range. Stated another way, if a period T computed with n=1.5, for example, is compared with a reference period T' which is substantially the medium value of the fluctuation range and a control is performed in such a manner as to eliminate the difference, any fluctuation of the actual tape speed will be confined to within the fluctuation range of the period T for n=1.5. As previously stated the constant n may be suitably selected depending on a desired accuracy.

The above-described control will be discussed hereinafter using the block diagrams.

Turning back to FIG. 1, pulse(s) output from the Hall elements 18 and 20 are respectively supplied to period measuring circuits 22 and 24 to have their periods measured thereby. Periods $T_S$ and $T_T$ of the reels 10 and 12 determined by the measuring circuits 22 and 24 are supplied to a computing circuit 26. In this circuit 26, larger one of the input periods $T_S$ and $T_T$, for example, is multiplied by the constant n whereupon the smaller period is added to the product to provide a period represented by the Eq. (5). The output T of the computing circuit 26 is fed to a comparator circuit 28.

A reference period circuit 30 is loaded with a reference period T' which was calculated, employing the Eq. (5), from a constant n selected in accordance with a speed necessary for fast feed and a desired accuracy, the reference period T' being fed to the comparator 28. For example, the reference period T' supplied to the comparator 28 may be the numerical value "72.7" which is the medium one of the values in the row Tn=1.5 of b in FIG. 2, which are based on a thirty times faster feed speed than the usual and n=1.5.

The comparator 28 compares the output period of the computing circuit 26 with the reference period T' and supplies its difference output E to a motor drive circuit 32. The motor drive circuit 32 supplies the reels 10 and 12 with drive signals $D_S$ and $D_T$, respectively, which correspond to the difference signal E and, in this manner, the rotation of each reel is controlled so that an instantaneous period T coincides with the reference period T' throughout the fast feed mode operation.

Optimumly, the arithmetic operation should be such that the computing circuit 26 always provides a reference period T'. This is undesirable, however, partly because complicate operation has to be performed and partly because weighting a period for each tape radius results in such a non-linear factor as an exponential. In accordance with this embodiment, the computing circuit 26 produces a period which corresponds to an instantaneous tape radius and approximate to a value provided by the Eq. (5). This allows the use of an extremely simple equation despite some fluctuation in tape movement, the fluctuation being neglibile in practice. Additionally, the constant n for weighting a period for each tape radius is not more than a simple linear factor which is easy to process and, therefore, particularly suitable for a microcomputer or like processor.

Figure 4:
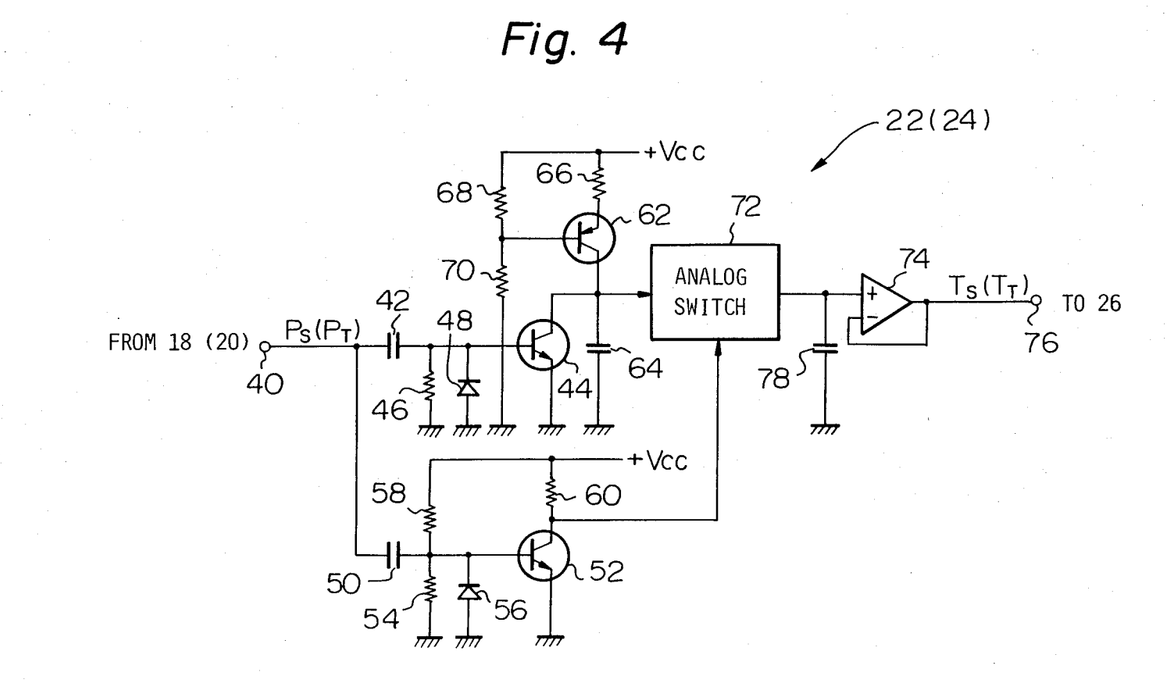
FIG. 4 is a diagram of a period measuring circuit included in the system of FIG. 1.

Referring to FIG. 4, there is shown a practical example of the period measuring circuit 22 or 24 of FIG. 1. The circuit receives at its input terminal 40 a pulse signal $P_S$ or $P_T$ which is output from the Hall element 18 associated with the supply reel 10 or the Hall element 20 associated with the take-up reel 12. The input terminal 40 is connected to the base of an NPN transistor 44 via a capacitor 42. A parallel connection of a resistor 46 and a diode 48 is connected between the base of the transistor 44 and ground. The input terminal 40 is also connected to the base of an NPN transistor 52 via a capacitor 50. Connected between the base of the transistor 52 and ground is a parallel connection of a resistor 54 and a diode 56. A resistor 58 is positioned between the jundtion of the capacitor 50 and the base of the transistor 52 and a +Vcc supply, constituting a voltage divider in cooperation with the resistor 54. The emitter of the transistor 52 is connected to ground and the collector thereof to the +Vcc supply via a resistor 60.

The emitter of the transistor 44 is connected to ground and the collector thereof to the collector of a PNP transistor 62. The collectors of the transistors 62 and 44 are individually connected to ground via a capacitor 64. The emitter of the transistor 62 is connected to the +Vcc supply via a resistor 66 while the base thereof is connected to the +Vcc supply via a resistor 68 and to ground via a resistor 70. The resistors 68 and 70 constitute a voltage divider in combination.

The collectors of the transistors 44 and 62 are individually connected to an analog switch 72 which in turn is connected to the collector of the transistor 52. The output of the analog switch 72 is connected to a non-inverting input of an operational amplifier (op amp) 74. The output of the op amp 74 is fed back to an inverting input of the op amp 74. The output of the op amp 74, which is the signal $T_S$ or $T_T$, is delivered to an output terminal 76. A capacitor 78 is connected between the noninverting input of the op amp 74 and ground.

Figure 5:
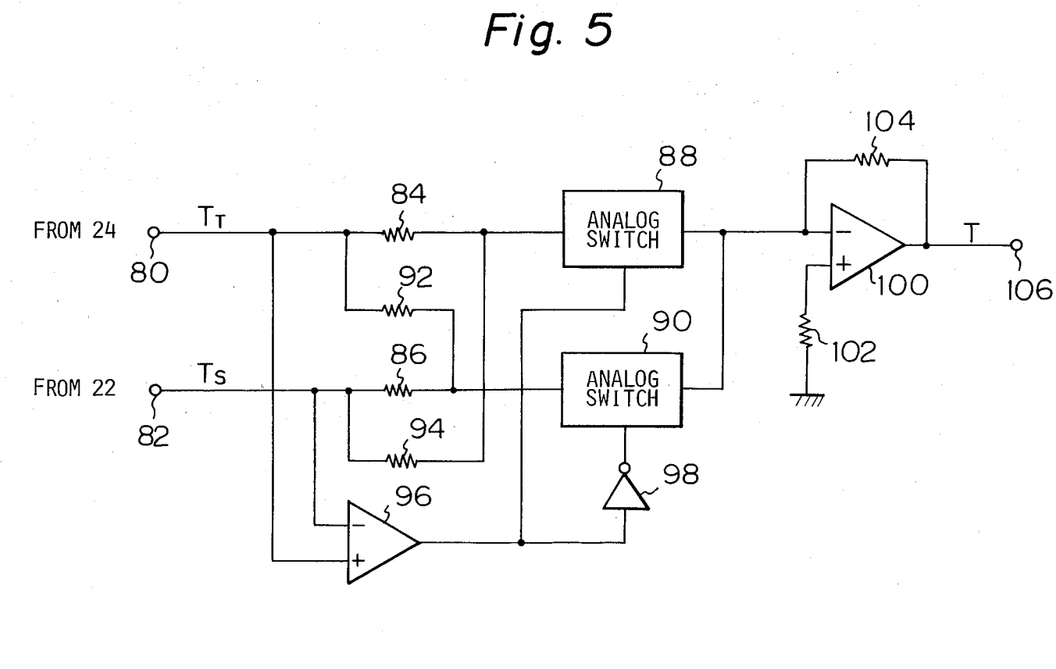
FIG. 5 is a diagram of a computing circuit included in the system of FIG. 1.

A practical example of the computing circuit 26 is illustrated in FIG. 5. The circuit 26 has two input terminals 80 and 82, one receiving an output $T_T$ of the period measuring circuit 24 and the other an output $T_S$ of the period measuring circuit 22. The input terminal 80 is connected via a resistor 84 to an analog switch 88 and, likewise, the input terminal 82 is connected via a resistor 86 to an analog switch 90. A resistor 92 is connected between the junction of the input terminal 80 and resistor 84 and the junction of the resistor 86 and analog switch 90. A resistor 94 is connected between the junction of the input terminal 82 and resistor 86 and the junction of the resistor 84 and analog switch 88. The input terminal 80 is connected to a non-inverting input of a comparator 96 and the input terminal 82 to an inverting input of the same. The output of the comparator 96 is connected to the analog switch 88 and, via an inverter 98, to the analog switch 90.

The outputs of the analog switches 88 and 90 are connected together to an inverting input of an op amp 100. The non-inverting input of the op amp 100 is connected to ground via a resistor 102. The output of the op amp 100 is connected to the inverting input of the same via a feedback resistor 104 and to an output terminal 106 of the circuit 26. The signal T appears at the output terminal 106.

Figure 6:
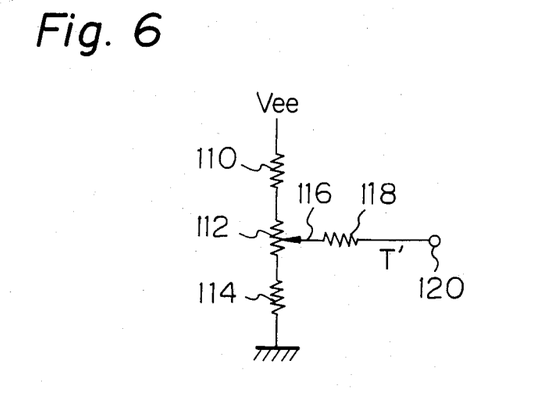
FIG. 6 is a diagram of a reference period circuit included in the system of FIG. 1.

Referring to FIG. 6, an example of the reference period circuit 30 is shown and includes resistors 110, 112 and 114 connected in series between the Vee supply and ground. The circuit 30 also includes an arm 116 adapted to set a desired voltage. A resistor 118 is connected with the arm 116. The resistor 118 connects to an output terminal 120 at which a reference period T' will appear.

Figure 7:
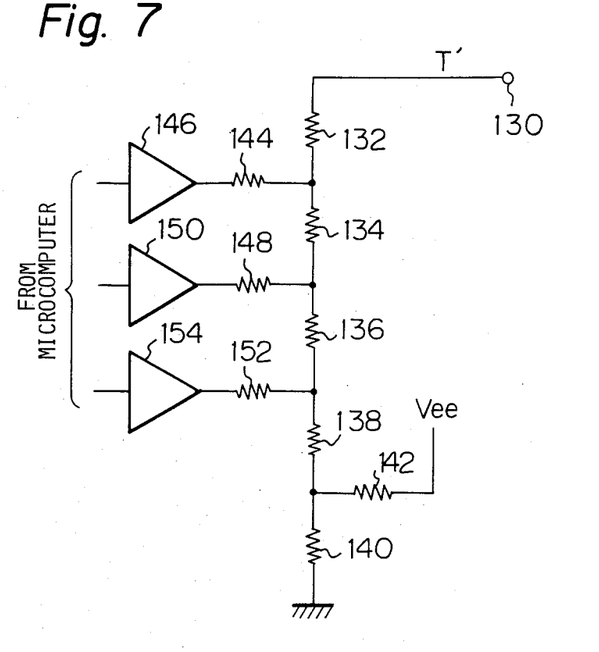
FIG. 7 is a diagram of an alternative to the circuit shown in FIG. 6.

An alternative to the reference period circuit 30 of FIG. 6 is shown in FIG. 7 and constructed to set up a reference period T' by means of a digital-to-analog (D/A) converter, which comprises a ladder arrangement of resistors. In detail, resistors 132, 134, 136, 138 and 140 are connected in series between ground and an output terminal 130 at which a reference period T' will appear. A resistor 142 is connected between the junction of the resistors 138 and 140 and the Vee supply. The junction of the resistors 132 and 134 is connected via a resistor 144 and an amplifier 146 to an output terminal of a microcomputer, the junction of the resistors 134 and 136 via a resistor 148 and an amplifier 150 to an output terminal of the microcomputer, and the junction of the resistors 136 and 138 via a resistor 152 and an amplifier 154 to an output terminal of the microcomputer. Thus, the reference period T' in this embodiment will be selected under the control of the microcomputer.

Figure 8:
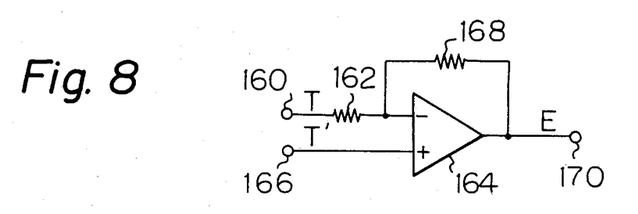
FIG. 8 is a diagram of a comparator circuit included in the system of FIG. 1.

An example of the comparator 28 of FIG. 1 is shown in FIG. 8. As shown, an output signal T of the computing circuit 26 comes in through an input terminal 160 and fed therefrom to an inverting input of an op amp 164 via a resistor 162. The output signal T' of the reference period circuit 30, on the other hand, appears at an input terminal 166 and is delivered therefrom to a non-inverting input of an op amp 164. The output of the op amp 164 is coupled to the inverting input thereof via a feedback resistor 168 and to an output terminal 170, at which the difference or error signal E appears.

In summary, it will be seen that the present invention provides a tape speed control system for a magnetic tape which insures a constant speed movement of the tape in a fast feed mode operation and thereby allows an interval between different musical pieces to be accurately detected as a predetermined period of time on the tape recorder with an automatic program locating system. The tape recorder with such a system is free from malfunctions such as sensing a "tacet" os a certain piece as an interval between two pieces, as would occur in the prior art tape recorders which give no consideration to the controlling the speed of fast feeding. The running amount of a tape is constant with respect to time and thereby monitoring the used amount of the tape is facilitated. Due to the means employed for performing a control such that the sum of periods coincides with a reference value which is variable in accordance with a desired tape speed, the tape speed in the fast feed mode can be determined as desired. For example, the tape may be taken up at an extremely high apeed at an initial stage of a take-up operation and at an extremely low speed at a final stage thereof, for the purpose of achieving both the quick take-up operation and the prevention of accidental spillover of the tape from the reel. What is required for the control is merely to weight larger (or smaller) one of rotation periods by a predetermined amount and cause the sum of the weighted and non-weighted periods to coincide with a predetermined value and, hence, a simple equation employing a linear factor suffices for the calculation of the sum period. The operation, therefore, can be readily handled by a microcomputer or the like.

Figure 9:
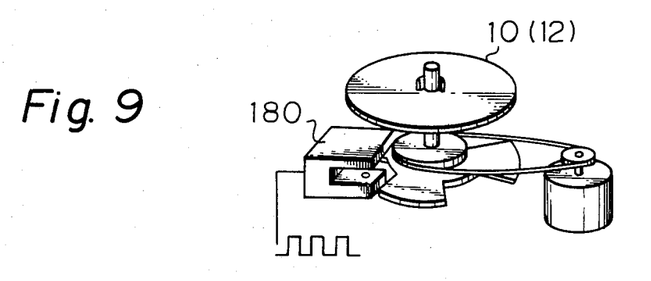
FIGS. 9 and 10 are schematic perspective views showing different methods of driving reels and generating rotation pulses applicable to the present invention.
Figure 10:
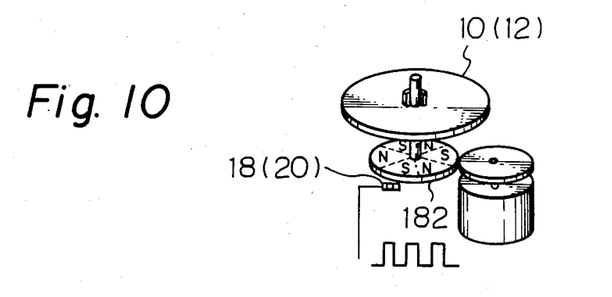

Various modifications will become possible for those skilled in the art after receiveing the teachings of the present disclosure without departing from the scope thereof. For example, while the embodiment has been shown and described as detecting larger one of pulse periods $T_S$ and $T_T$ of the reels 10 and 12 and subjecting it to linear weighting, such is by way of example only and may be replaced by a construction which detects smaller one of the two periods to weight it by a fraction such as ⅓ or ⅔. The direct drive for the reels shown and described may be substituted for by a system shown in FIG. 9 in which the reel 10 (12) is driven by a belt and its rotation is sensed by a photointerrupter 180, or a system shown in FIG. 10 in which the reel 10 (12) is driven by a rim and its rotation is sensed by a magnet disc 182 and the Hall element 18 (20).

What is claimed is:

1. A system for controlling the running speed of a magnetic tape in a fast feed mode operation of a magnetic tape recorder which includes a take-up reel and a supply reel each being driven for rotation by drive means, said system comprising:

rotation period detector means for detecting a rotation period of the take-up reel and a rotation period of the supply reel and producing outputs indicative of the detected rotation periods;

computing means for weighting one of the detected rotation periods and producing a sum of the weighted rotation period and the other which is the non-weighted rotation period, in which assuming that a weighting constant is n, n=1.5, said computing means comprising two input terminals receiving the outputs of said rotation period detection means, one of said input terminals being connected via a first resistor means to a first analog switch means, the other of said input terminals being connected via a second resistor to a second analog switch means, a third resistor connected between the junction of said one input terminal and said first resistor means and the junction of said second resistor and said second analog switch means, a fourth resistor connected between the junction of said other input terminal and said second resistor and the junction of said first resistor means and said first analog switch means, a comparator having a noninverting input connected to said one inut terminal and an inverting input connected to said other input terminal, said comparator having an output connected to said first analog switch means and via an inverter to said second analog switch means;

reference period predetermining means for predetermining a reference rotation period and producing a reference period output; and comparing means for comparing the sum period produced by the computing means with the reference period output from the reference period predetermined means and generating a difference signal, said difference signal being fed to the drive means;

whereby the magnetic tape is moved at a selected speed regardless of the tape roll radius built up on the take-up reel.

2. A system as claimed in claim 1, in which said computing means is operable for weighing the said one detected rotation period which is larger than the other non-weighted rotation period.

3. A system as claimed in claim 1, in which said computing means is operable for weighing the said one detected rotation period which is smaller than the other non-weighted rotation period.

4. A system is claimed in claim 1, in which the reference period is variable.

* * * * *